United States Patent
Minamizawa

[19]

[11] Patent Number: 5,847,844
[45] Date of Patent: Dec. 8, 1998

[54] COMPUTER-FACSIMILE CONNECTED SYSTEM

[75] Inventor: Fumihiro Minamizawa, Toyoake, Japan

[73] Assignee: Brother Kogyo Kabushiki Kaisha, Aichi-ken, Japan

[21] Appl. No.: 747,650

[22] Filed: Nov. 13, 1996

[30] Foreign Application Priority Data

Nov. 13, 1995 [JP] Japan ................................. 7-294354

[51] Int. Cl.⁶ ..................................................... H04N 1/32
[52] U.S. Cl. ........................................... 358/442; 395/114
[58] Field of Search ..................................... 358/400, 402, 358/443, 407, 434, 440, 442, 468, 435–439; 379/100.01, 100.02, 100.15; 375/238; 395/114

[56] References Cited

U.S. PATENT DOCUMENTS

| | | | |
|---|---|---|---|
| 4,816,911 | 3/1989 | Kirsch et al. | 358/400 |
| 5,241,403 | 8/1993 | Ishikawa | 358/400 |
| 5,307,174 | 4/1994 | Saito | 358/400 |
| 5,313,285 | 5/1994 | Yokoyama | 358/400 |
| 5,461,488 | 10/1995 | Witek | 358/402 |
| 5,502,653 | 3/1996 | Lewis | 364/514 B |
| 5,696,600 | 12/1997 | Perkins | 358/442 |

*Primary Examiner*—Thomas D. Lee
*Assistant Examiner*—Jerome Grant, II
*Attorney, Agent, or Firm*—Kane, Dalsimer, Sullivan, Kurucz, Levy, Eisele and Richard, LLP

[57] ABSTRACT

Provided is a computer-facsimile connected system, which includes a computer provided with a fax modem and a facsimile device electrically connected to the computer The computer has a modem selecting system which selects one of the fax modem and a modem provided in the facsimile device by comparing performances thereof. The selected modem is used when the computer transmits a signal through a modem.

15 Claims, 2 Drawing Sheets

COMPUTER-FACSIMILE CONNECTED SYSTEM

BACKGROUND OF THE INVENTION

The present invention relates to a computer-facsimile connected system for connecting a computer having a built-in fax-modem and an externally provided facsimile device provided with its own modem.

Conventionally, computers having built-in fax modems have been known. In such computers, when a document is created and sent to somewhere by facsimile, instead of printing the document on paper and then sending the same by facsimile, it is possible to directly send the document by facsimile without printing out the document, with use of the built-in fax modem. In such a situation, the fax modem is useful, and the document as transmitted by facsimile bears less noise in comparison to a transmission using a hard copy with a facsimile device.

When a document created by a word processor or the like on a computer is directly sent to a facsimile device, a fax modem driver program is used. The fax modem driver program is a program similar to a printer driver program. Generally, when a document created on the computer is printed, the printer driver program is called, and the data is sent to the printer. Similarly, when the data is to be sent to the facsimile device through the fax modem, the fax modem driver program is called. The fax modem driver program converts the data into facsimile data, and sends the facsimile data through the fax modem.

The fax modem driver program is also capable of receiving a facsimile transmission. When the facsimile transmission is received with the fax modem, the facsimile data received through the fax modem is converted into an image data which can be processed by the computer.

Although the transmission using the fax modem has an advantage as described above, it cannot replace the transmission between facsimile devices. For example, if there is only a hard copy of a document, in order to use the fax modem, the document is firstly read with a scanner or the like and converted into a digital image data, and thereafter the scanned image is transmitted with the facsimile device.

Recently, a computer-facsimile connected system is suggested and constructed. The computer-facsimile connected system is a system having a computer provided with a built-in fax modem, and a facsimile device having its own modem. In such a system, a user selects one of the modem provided in the facsimile device or the fax modem provided in the computer when a facsimile application is executed.

In the conventional system, a user has to select which modem is to be used, and once the selection is made, i.e., which one of the fax modem or the modem of the facsimile device is used is determined, the selection is effective until the user changes the selection. Therefore, regardless of the performance of the modem used in the facsimile device or the built-in modem, the modem previously selected is used for transmitting facsimile signal.

Various combinations of the computer and the facsimile devices may be possible. Accordingly, selection of the built-in fax modem or the modem of the facsimile device done by the user is troublesome. Further, when the user selects the fax modem or the modem of the facsimile device, the performance of each modem should be taken into account. However, if the user cannot determine which modem is better, the user may select the worse modem.

SUMMARY OF THE INVENTION

It is therefore an object of the invention to provide an improved computer-facsimile connected system which automatically selects one of the built-in modem or the modem of the facsimile device, having a better characteristic.

For the above object of the Invention, there is provided a computer-facsimile connected system, comprising, a computer provided with a fax modem, a facsimile device electrically connected to the computer, the facsimile device being provided with a modem, a modem selecting system which selects one of the fax modem and the modem provided in the facsimile device by comparing performances thereof, a selected modem being used when the computer transmits a signal through a modem.

Optionally, the modem selecting system is provided in the computer.

Further optionally, when one of the fax modem and the modem provided in the facsimile device is selected by the modem selecting system, the other one of the fax modem and the modem provided in the facsimile device is turned off.

Further, the computer-facsimile connected system has a power controlling system, and wherein the modem selecting system controls the power controlling system to turn off the other one of the fax modem and the modem provided in the facsimile device.

Still optionally, the power controlling system comprises a first computer controllable power unit provided in the computer, the first computer controllable power unit being capable of turning on and off the fax modem, and a second computer controllable power unit provided in the facsimile device, the second computer controllable power unit being capable of turning on and off the modem provided in the facsimile device.

Furthermore, the modem selecting system sends a command requiring a performance data of the modem to the facsimile device, the facsimile device sending the performance data to the modem selecting system in response to the command.

Further, the modem selecting system selects the one of the fax modem and the modem provided in the facsimile device based on a performance of the fax modem and the performance data transmitted from the facsimile device.

According to another aspect of the invention, there is provided a computer which is capable of using a modem provided in a facsimile device which is connected to the computer, the computer comprising a fax modem and a modem selecting system which selects one of the fax modem and the modem provided in the facsimile device by comparing performances thereof, a selected modem being used when the computer transmits a signal through a modem.

According to further aspect of the invention, there is provided a facsimile device which is connectable to a computer for the computer to use a modem provided in the facsimile device, the facsimile device comprising, system for receiving a predetermined command from the computer, and system for sending a performance data to the computer in response to receiving the predetermined command.

Optionally, the facsimile device further comprises a computer controllable power unit for supplying power to the facsimile device, the computer controllable power unit stop supplying power when a turn-off command is transmitted from the computer to the facsimile device.

According to still further aspect of the invention, there is provided a computer-facsimile connected system, comprising, a computer provided with a fax modem, a facsimile device electrically connected to the computer, the facsimile device being provided with a modem, system for comparing performances of the fax modem and the modem, and system for selecting one of the fax modem and the modem, the selected one of the fax modem and the modem having better performance characteristics than the other.

Optionally, the selecting system is provided in the computer.

Further, the computer-facsimile connected system comprises system for turning off the other one of the fax modem and the modem.

Still optionally, the selecting system selects the fax modem when the modem is turned off when selection by the selecting system is made.

Furthermore, the selection is made when the computer executes a facsimile program using fax modem.

DESCRIPTION OF THE ACCOMPANYING DRAWINGS

FIG. 1 is a block diagram of a computer-facsimile connected system embodying the invention; and FIG. 2 is a flowchart illustrating data transmission process.

DESCRIPTION OF THE EMBODIMENT

Figure 1:
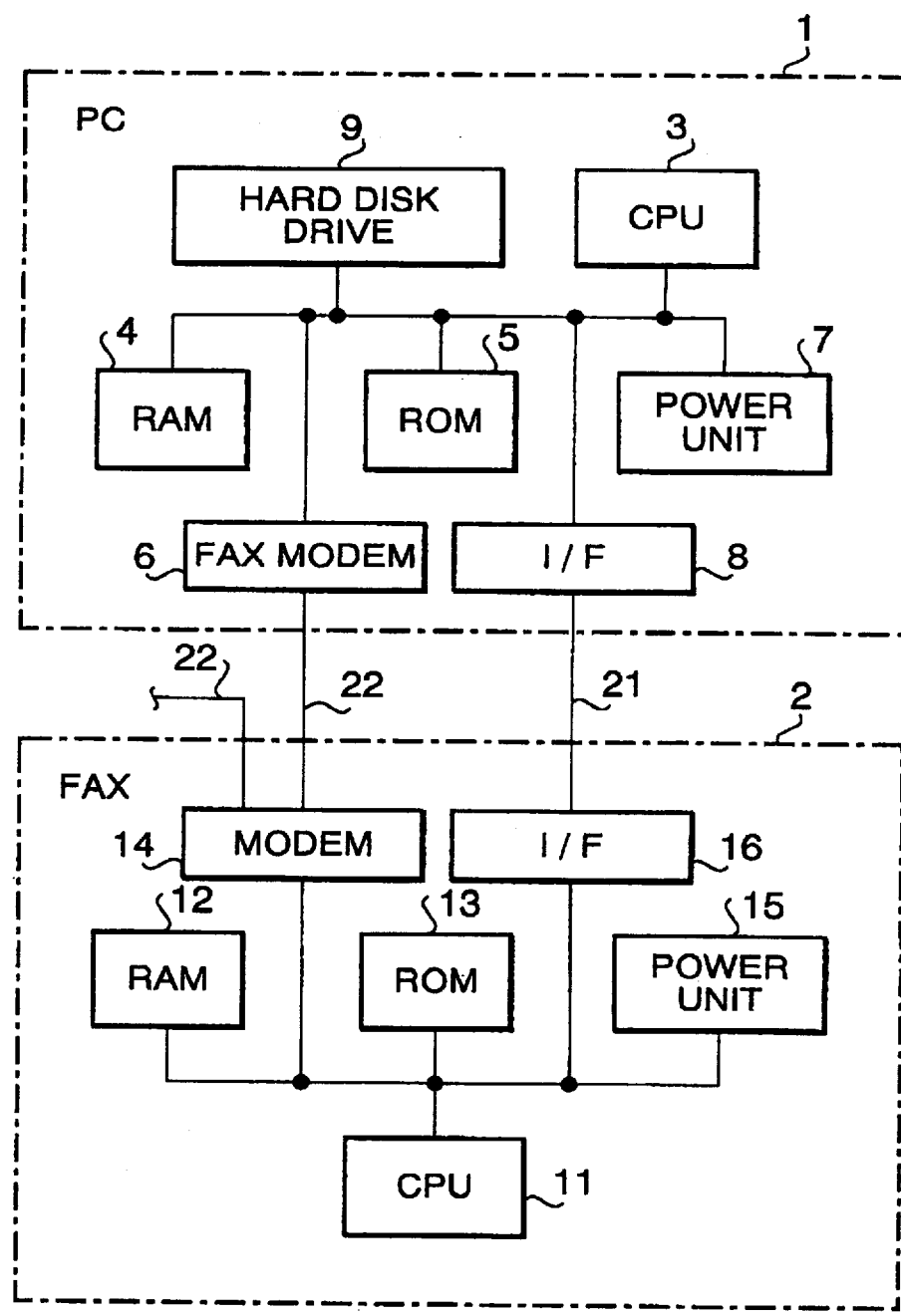

FIG. 1 is a block diagram of a computer-facsimile connected system. The system shown FIG. 1 has a personal computer 1 and a facsimile device 2. The personal computer 1 is provided with a CPU (Central Processing Unit) 3, a RAM (Random Access Memory) 4, a ROM (Read Only Memory) 5, a fax modem 6, a power unit 7, an interface 8 for connecting the facsimile device 2, a hard disk drive 9, and the like. The facsimile device 2 is provided with a CPU 11, a RAM 12, a ROM 13, a modem 14, a power unit 15, an interface for connecting the personal computer 1, and the like.

The personal computer 1 is a general-purpose personal computer, which includes the built-in fax modem 6, and further the facsimile device 2 is externally provided and connectable to the personal computer 1. The facsimile device 2 is capable of transmitting a normal facsimile transmission, and further the facsimile device is capable of exchanging operation commands with the personal computer 1. The CPU 3 controls the entire operation of the personal computer 1. The RAM 4 stores various data. The ROM 5 stores various programs to be executed by the CPU 3. The fax modem 6 modulates and demodulates a facsimile signal. The power unit 7 turns on/off the power supply to the fax modem 6. The interface 8 for the facsimile device 2 is for transmitting various control commands to and from the facsimile device 2 The hard disk drive 9 is used for reading and writing various data and programs to and from a hard disk.

The CPU 22 controls the operation of the facsimile device 2. The RAM 12 stores various data. The ROM 13 stores various programs to be executed by the CPU 22 The modem 14 modulates and demodulates facsimile signals. The power unit 15 turns on/off the power supply to the facsimile device 2. The interface 16 is used for transmitting various control commands to and from the personal computer 1.

The interface 8 of the personal computer 1 and the interface 16 of the facsimile device 2 are interconnected through a control line 21. The modem 14 is connected with a telephone line 22. The telephone line 22 is extends to the fax modem 6 through the modem 14. The telephone line 22 between the fax modem 6 and the modem 14, and the control line 21 between the interfaces 8 and 16 are composed of a single cable, i.e., different parts of the same cable.

The CPU 3 of the personal computer 1 compares the performance of the fax modem 6 and the modem 14 of the facsimile device 2 when the CPU 3 executes the facsimile application, and determines which one of the fax modem 6 or the modem 14 has superior performance. Further, the CPU 3 turns off the built-in fax modem 6 when the modem 14 is to be used. If the fax modem 6 is used, then the CPU 3 turns of the facsimile device 2.

Various circuits and members are provided in the personal computer 1 and the facsimile device 2. However, such circuits and members of the personal computer 1 and the facsimile device are well-known and the description thereof will be omitted herein.

Figure 2:
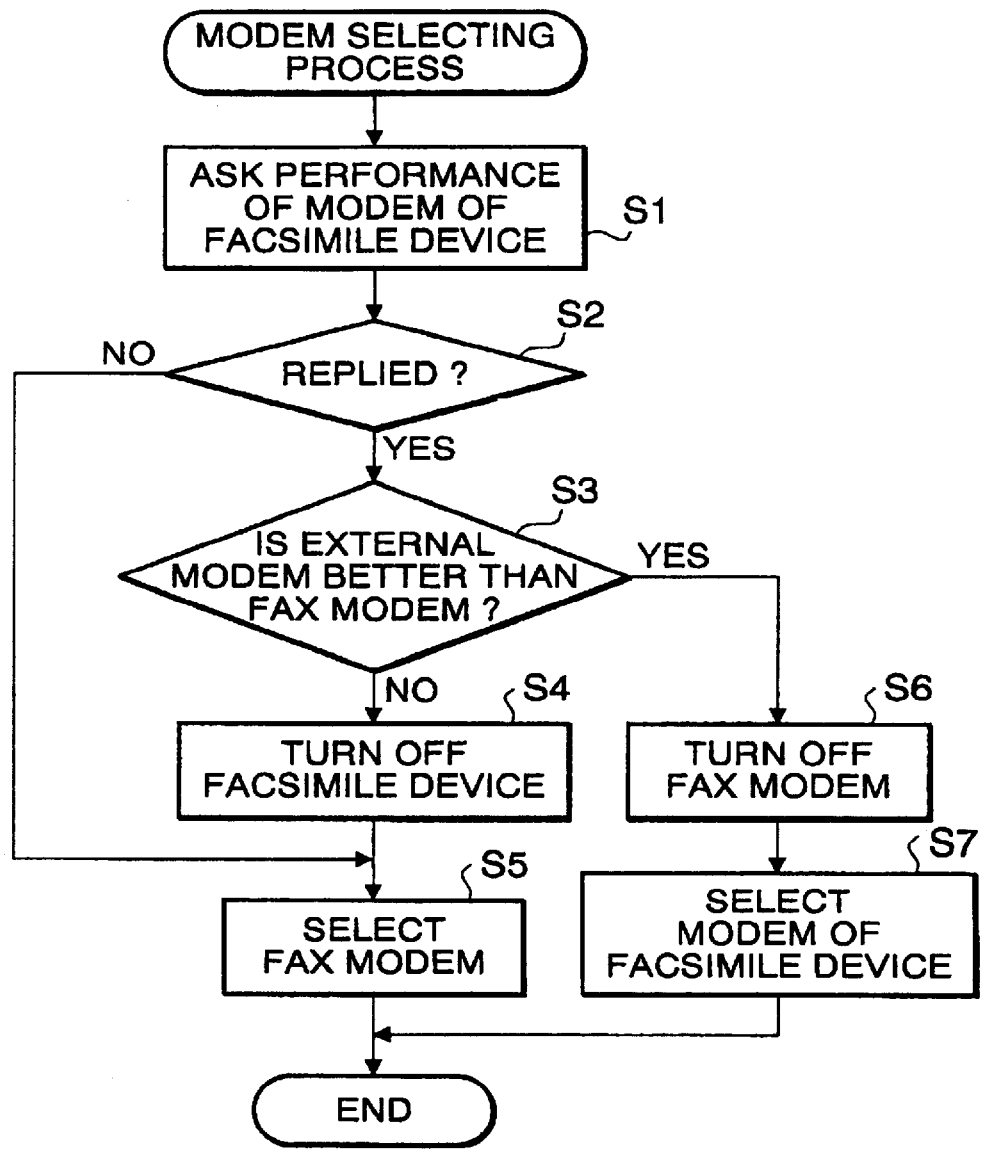

FIG. 2 is a flowchart illustrating a modem selecting process.

At step S1, the CPU 3 of the personal computer 1 transmits a command requesting data indicative of the performance of the modem 14 of the facsimile device 2, from the interface 8 to the interface 16. The performance includes, for example, a transmission speed, method of data compression, and the like.

If the facsimile device 2 is turned on, the CPU 11 of the facsimile device 2 transmits a performance data in response to the command transmitted, at S1, from the CPU 3. The performance data is transmitted from the CPU 11 to the interface 8 through the interface 16.

If the facsimile device 2 is turned off when the CPU 3 transmits the command at step S1, no data is returned from the facsimile device 2.

At step S2, the CPU 3 determines whether the performance data is transmitted from the facsimile device 2 within a predetermined period of time, in response to the command transmitted at step S1. If the facsimile device 2 transmits the performance data (S2:YES), the CPU 3 compares the performance of the modem 14 included in the performance data with the performance of the fax modem 6 in order to select one of the modem 14 or the fax modem 6 (S3). If the performance of the fax modem 6 is better than the performance of the modem 14 or the same (S3:NO), the CPU 3 transmits a command instructing turning off of the facsimile device 2 trough the interfaces 8 and 16 (S4).

In response to the command to turn off the facsimile device 2, the CPU 11 controls the power unit 15 to stop supplying power to the facsimile device 2. Since the facsimile device 2 is turned off when it is not used, unnecessary power consumption can be avoided.

At step S5, the CPU 3 performs various setting operations, which are stored in the RAM 4, in order to use the fax modem 6, and then the modem selecting process is finished.

If the CPU 3 judges that the mode 14 is better than the fax modem 6 (S3:YES), the CPU 3 controls the power unit 7 to turn off the fax modem 6 (S6) Since the fax mode 6 which is not used is turned off, unnecessary power consumption is avoidable. At step S7, the CPU 3 performs setting operations, which are stored in the RAM 4, in order to use the modem 14 of the facsimile device 2, and the modem selecting process is finished.

If the facsimile device 2 is turned off, the reply data is not transmitted from the facsimile device 2 (S2:NO). In this case, control proceeds from step S2 to step S5 and selects the fax modem 6.

The above described operation is performed when the personal computer 1 is turned on. When the personal computer 1 is turned off, if the facsimile device 2 is turned on, then facsimile transmission (sending and receiving facsimile data) can be done with use of the facsimile device 2.

As described above, according to the computer-facsimile connecting system, the fax modem built in the computer and the modem of the facsimile device are compared, and one having a higher performance is selected to be used. This process is executed by the CPU of the computer. Accordingly, a user does not need to perform a particular operation, and the better modem is automatically selected. Therefore, the system is free from troublesome operation, and mis-connection of the modem.

Further, according to the system described above, among two modems, only the one to be used is maintained to be turned on, and the other is turned off, automatically under control of the CPU of the computer. Accordingly, unnecessary power consumption can be avoided.

Furthermore, according to the system described above, the CPU of the computer transmits a command requiring a performance data of the modem of the facsimile device. Then, in response to the command from the computer CPU, the CPU of the facsimile device transmits the performance data to the computer. The computer CPU then determines which modem to be used based on the performance data. Accordingly, it is not necessary to pre-store the modem data connectable to the computer.

In the system described above, in response to the command transmitted from the computer CPU, the CPU of the facsimile device controls the power unit to stop power supply. Accordingly, the computer and the facsimile device are not necessarily be connected with power line, which reduces the number of lines therebetween.

In the embodiment, the system having a computer and a facsimile device is described. However, the computer can be replaced by a work station, word processor, and the like.

Still further, in the system described above, the modem which is not used is automatically turned off. However, the most important idea is to select the modem among two, and accordingly, the power of the modem may not be turned off when it is determined not to be used.

In the above-described embodiment, comparison of performance of the modems is executed every time when a facsimile application is performed. This process can be modified. For example, the comparison is executed first time when the facsimile application is executed. Then, the comparison result is stored in a non-volatile memory such as an EEPROM. Thereafter, when the facsimile application is executed, the data stored in the EEPROM is referred to. In this case, when the fax modem of the computer and/or the facsimile device are exchanged, the comparison should be performed again.

Furthermore, generally, a modem provided in a facsimile device is a fax modem. However, even if a data/fax modem is provided in a facsimile device, the present invention is applicable. In such a case, a modem may be selected by comparing not only the performance for facsimile transmission, but the performance for data transmission.

The present disclosure relates to subject matter contained in Japanese Patent Application No. HEI 07-294354, filed on Nov. 13, 1995, which is expressly incorporated herein by reference in its entirety.

What is claimed is:

1. A computer-facsimile connected system comprising:
   a computer provided with a fax modem, said computer being capable of transmitting a signal over a telephone line through said fax modem;
   a facsimile device electrically connected to said computer, said facsimile device being provided with a modem, said computer being capable of transmitting a signal over said telephone line through said modem provided in said facsimile device;
   a modem selecting system which selects the modem to be used by said computer to transmit a signal over said telephone line, said modem selecting system including means for discriminating between said fax modem and said modem provided in said facsimile device based on predetermined performance characteristics thereof and means for selecting the modem having the better performance characteristics, said selected modem being used by said computer to transmit a signal over said telephone line.

2. The computer-facsimile connected system according to claim 1, wherein said modem selecting system is provided in said computer.

3. The computer-facsimile connected system according to claim 2, wherein when one of said fax modem and said modem provided in said facsimile device is selected by said modem selecting system, the other one of said fax modem and said modem provided in said facsimile device is turned off.

4. The computer-facsimile connected system according to claim 3, further comprising power controlling system, and wherein said modem selecting system controls said power controlling system to turn off said other one of said fax modem and said modem provided in said facsimile device.

5. The computer-facsimile connected system according to claim 4, wherein said power controlling system comprises a first computer controllable power unit provided in said computer, said first computer controllable power unit being capable of turning on and off said fax modem, and a second computer controllable power unit provided in said facsimile device, said second computer controllable power unit being capable of turning on and off said modem provided in said facsimile device.

6. The computer-facsimile connected system according to claim 2, wherein said modem selecting system sends a command requiring performance data of said modem to said facsimile device, said facsimile device sending said performance data to said modem selecting system in response to said command.

7. The computer-facsimile connected system according to claim 6, wherein said modem selecting system selects said one of said fax modem and said modem provided in said facsimile device based on a performance of said fax modem and said performance data transmitted from said facsimile device.

8. A computer which is capable of using a modem provided in a facsimile device which is connected to said computer, said computer comprising:
   a fax modem;
   a modem selecting system which selects the modem to be used by said computer to transmit a signal over a telephone line, said modem selecting system including means for discriminating between said fax modem and said modem provided in said facsimile device based on predetermined performance characteristics thereof and means for selecting the modem having the better performance characteristics, said selected modem being used by said computer to transmit a signal over said telephone line.

9. A facsimile device which is connectable to a computer having a fax modem, said facsimile device comprising:
   a modem, said computer being capable of transmitting a signal over a telephone line through said modem or through said fax modem;

means for receiving a predetermined command from said computer;

and means for sending performance data to said computer in response to receiving said predetermined command, said performance data being used by said computer to discriminate between said modem and said fax modem.

10. The facsimile device according to claim 9, further comprises a computer controllable power unit for supplying power to said facsimile device, said computer controllable power unit stop supplying power when a turn-off command is transmitted from said computer to said facsimile device.

11. A computer-facsimile connected system comprising:

a computer provided with a fax modem;

a facsimile device electrically connected to said computer, said facsimile device being provided with a modem, said computer capable of transmitting a signal over a telephone line through said fax modem or said modem provided in said facsimile device;

means for discriminating between said fax modem and said modem provided in said facsimile device by comparing predetermined performance characteristics of said fax modem and said modem provided in said facsimile device; and means for selecting one of said fax modem and said modem provided in said facsimile device to be used by said computer to transmit a signal over said telephone line, said selected modem having better performance characteristics than the other.

12. The computer-facsimile connected system according to claim 11, wherein said selecting means is provided in said computer.

13. The computer-facsimile connected system according to claim 12, further comprising means for turning off the other one of said fax modem and said modem.

14. The computer-facsimile connected system according to claim 13, wherein said selecting means selects said fax modem when said mode is turned off when selection by said selecting means is made.

15. The computer-facsimile connected system according to claim 14, wherein said selection is made when said computer executes a facsimile program using a fax modem.

* * * * *